(No Model.) 8 Sheets—Sheet 2.

O. B. SHALLENBERGER.
METHOD OF AND MEANS FOR MEASURING ENERGY OF ALTERNATING ELECTRIC CURRENTS.

No. 531,866. Patented Jan. 1, 1895.

WITNESSES:

INVENTOR
Oliver B. Shallenberger
BY
ATTORNEYS

(No Model.) 8 Sheets—Sheet 3.

O. B. SHALLENBERGER.
METHOD OF AND MEANS FOR MEASURING ENERGY OF ALTERNATING ELECTRIC CURRENTS.

No. 531,866. Patented Jan. 1, 1895.

WITNESSES:
H. G. Carr
G. H. Winslow.

INVENTOR
Oliver B. Shallenberger
BY
Perry & MacKaye
ATTORNEYS.

(No Model.) 8 Sheets—Sheet 4.

O. B. SHALLENBERGER.
METHOD OF AND MEANS FOR MEASURING ENERGY OF ALTERNATING ELECTRIC CURRENTS.

No. 531,866. Patented Jan. 1, 1895.

WITNESSES:
W. G. Carr
G. H. Winslow

INVENTOR
Oliver B. Shallenberger
BY
Kerr & MacKaye
ATTORNEYS (No Model.) 8 Sheets—Sheet 5.
O. B. SHALLENBERGER.
METHOD OF AND MEANS FOR MEASURING ENERGY OF ALTERNATING ELECTRIC CURRENTS.

No. 531,866. Patented Jan. 1, 1895.

WITNESSES:
H. G. Carr
G. H. Winslow.

INVENTOR
Oliver B. Shallenberger
BY
Perry & MacKaye
ATTORNEYS (No Model.) 8 Sheets—Sheet 6.

O. B. SHALLENBERGER.
METHOD OF AND MEANS FOR MEASURING ENERGY OF ALTERNATING ELECTRIC CURRENTS.

No. 531,866. Patented Jan. 1, 1895.

WITNESSES:
H. G. Carr
G. H. Winslow

INVENTOR
Oliver B. Shallenberger
BY
Perry & MacKaye
ATTORNEYS.

(No Model.) 8 Sheets—Sheet 7.
O. B. SHALLENBERGER.
METHOD OF AND MEANS FOR MEASURING ENERGY OF ALTERNATING ELECTRIC CURRENTS.

No. 531,866. Patented Jan. 1, 1895.

WITNESSES:

INVENTOR
Oliver B. Shallenberger
BY
Terry & MacKaye
ATTORNEYS (No Model.) 8 Sheets—Sheet 8.

O. B. SHALLENBERGER.
METHOD OF AND MEANS FOR MEASURING ENERGY OF ALTERNATING ELECTRIC CURRENTS.

No. 531,866. Patented Jan. 1, 1895.

WITNESSES:
H. G. Carr
G. H. Winslow

INVENTOR
Oliver B. Shallenberger
BY
Kerr & MacKaye
ATTORNEYS

UNITED STATES PATENT OFFICE.

OLIVER B. SHALLENBERGER, OF ROCHESTER, PENNSYLVANIA.

METHOD OF AND MEANS FOR MEASURING ENERGY OF ALTERNATING ELECTRIC CURRENTS.

SPECIFICATION forming part of Letters Patent No. 531,866, dated January 1, 1895.

Application filed September 19, 1894. Serial No. 523,515. (No model.)

*To all whom it may concern:*

Be it known that I, OLIVER B. SHALLENBERGER, a citizen of the United States, residing at Rochester, in the county of Beaver and State of Pennsylvania, have invented a new and useful Improvement in Methods of and Means for Measuring the Energy of Alternating Electric Currents, (Case No. 611,) of which the following is a specification.

My invention relates to the measurement of alternating electric currents, and it has for its object the provision of a method of and an apparatus for measuring, indicating, registering or recording the actual energy transmitted by alternating currents, which shall be simple and efficient and of wide application.

The invention is particularly applicable to the measurement of multiphase alternating currents, although useful also for measuring single-phase alternating currents, and I desire to be distinctly understood that I do not limit myself in the use of the novel features of the invention to multiphase alternating current measurement.

I have demonstrated by experiment that if a closed conducting circuit of suitable form, mounted so as to be free to rotate, be placed in proper inductive relation to two alternating magnetic fields of the same periodicity, a torque is produced which is proportional to the product of three elements; namely, the strengths of the respective magnetic fields and a function approximating the sine of the angle representing the difference of phase between them. Following this principle, I have devised a method of and an apparatus for measuring accurately the amount of energy transmitted by two-phase or other multiphase alternating currents.

My invention may be applied in a simple manner by employing a form of apparatus in which two actuating coils are inductively related to a movable element, one of said coils being supplied with current proportional to that in the work circuit, and the other with current proportional to and in quadrature with the electromotive force impressed upon the work circuit, the current in these coils producing a resultant shifting field, within which an armature is thereby caused to rotate. The torque thus produced is proportional to the energy transmitted to the work circuit. A retarding force is applied, such as that produced by the motion of a closed conductor in a constant magnetic field, which is proportional to the velocity of rotation, so that the total movement during an interval of time is directly proportional to the time integral of the energy transmitted, and it may be recorded in any convenient manner.

In the accompanying drawings, which are illustrative of my invention, Fig. 2ª shows the relative location of the armature and coils, the latter being shown in section.

I will first describe the construction and operation of the meter when employed with, and directly connected in circuits carrying two-phase currents differing by a quarter period and transmitted over four wires, and will subsequently explain some of the modifications found useful under other conditions.

The form of the several parts of the apparatus and their arrangement may be varied to a considerable extent.

Figure 10:
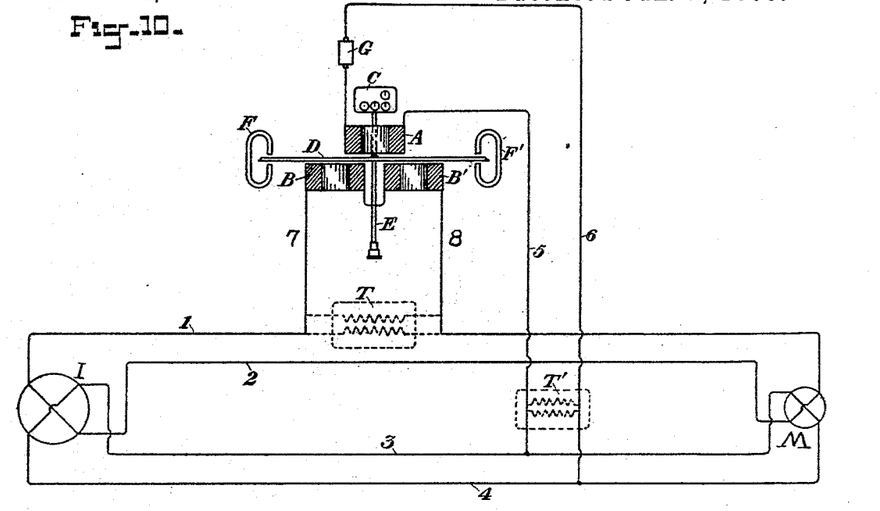
Fig. 10 is a diagram showing two-phase work circuits and connections between the same and the meter directly, but showing in dotted lines the method of connecting transformers between the main circuits and the meter.

Referring to the drawings, A is an inducing coil of comparatively small wire connected in shunt, by means of wires 5, 6, to the circuit 3, 4, (Fig. 10.)

B and B' are inducing coils of relatively large wire connected in series or in parallel with each other and in series with the work circuit 1, 2, by means of the loop 7, 8. The circuits 1, 2, and 3, 4, lead from a two-phase generator I to a work circuit containing motors or other translating devices. (See Fig. 10.)

The various parts of the meter are supported by one or more arms $k'$, $k^2$ extending from the frame K. The coil A is carried by the arm $k'$, and is secured thereto by means of a suitable clamping device $p$. The coils B, B' are supported upon the arm $k^2$ by means of clamping devices carried by the plate M', in any convenient manner. The position of the plate M', and therefore of the coils B, B', may be adjusted by means of the screws $r$, $r'$, extending through the slot in the arm $k^2$, and the coil A may be adjusted in a similar manner.

Figure 16:
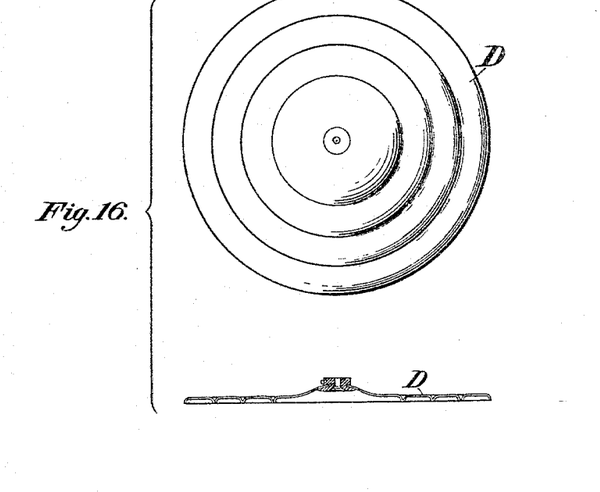
Figs. 16 and 17 illustrate modified forms of the movable element of the meter.
Figure 17:
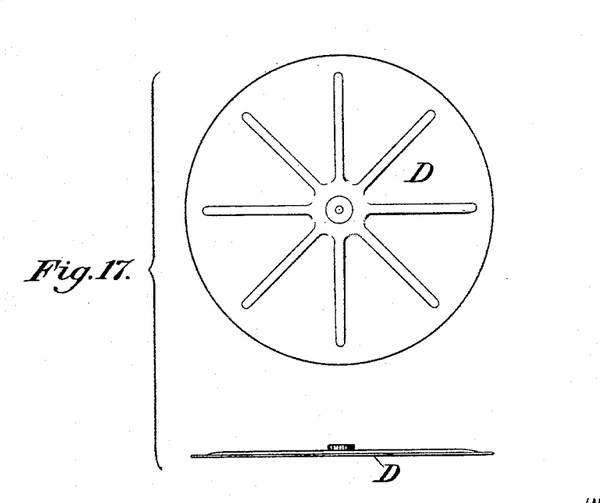

Between the coil A and the coils B B' is located a disk D of thin aluminum, copper, or other conducting metal, mounted rigidly upon the shaft E, which is free to rotate with a very small amount of friction. I have found that almost any metal of reasonably high conductivity is suitable in the construction of the disk, but aluminum has certain advantages on account of its high conductivity relatively to its weight, so that the disk may be made sufficiently rigid without introducing excessive friction and without liability of injury to the bearings. A simple flat disk may be used, but in order to increase its rigidity I have found it desirable to turn over the edge as shown at $d$, by which means the vibration due to the alternating current is suppressed. If preferred, the disk may be ribbed or corrugated circumferentially, as shown in Fig. 16, or radially, as shown in Fig. 17, or it may have any equivalent warped surface or stiffened shape in which the form of cross section is of greater depth than that due to the thickness of the plate alone.

The bottom bearing L for the shaft E, is preferably a cup of agate or other hard material in which the rounded end of the shaft rests. Suitable counting or registering mechanism C is geared to the upper end of the shaft.

F and F' are permanent magnets between the poles of which the disk moves, its rotation being retarded by the eddy currents induced in it. For the purpose of providing magnets which shall occupy as little lateral space as possible, I construct the magnets F, F' of a C-shape, having their greatest dimensions perpendicular to the face of the disk D, which passes between the poles. These magnets should be so proportioned in strength to the maximum torque exerted upon the disk that the resulting speed is slow relatively to that of synchronism, and also sufficiently slow to avoid appreciable resistance due to motion through the air.

G is a non-inductive resistance coil connected in series with the shunt coil A, and is provided with a switch arm or equivalent device H for including more or less of it in circuit, as may be found necessary.

Figure 1:
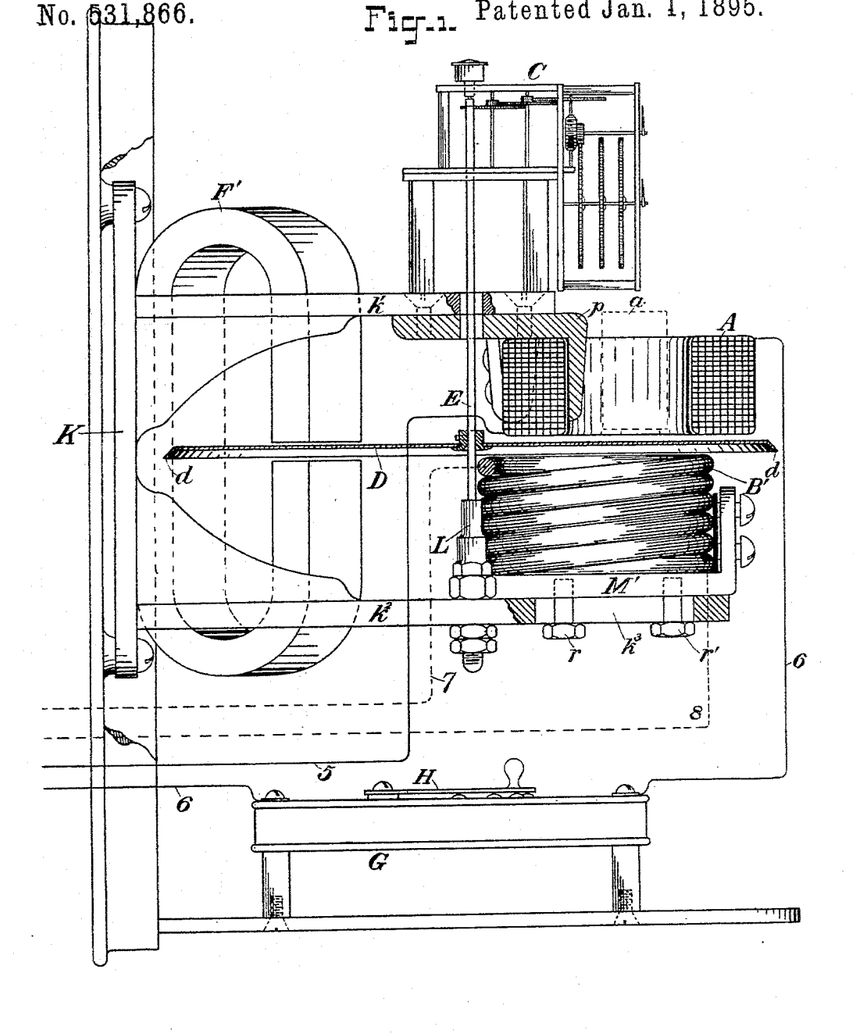
Figure 1 is a side elevation of a form of meter which I have found to be suitable for practical use, certain parts being broken away and others shown in section.
Figure 2:
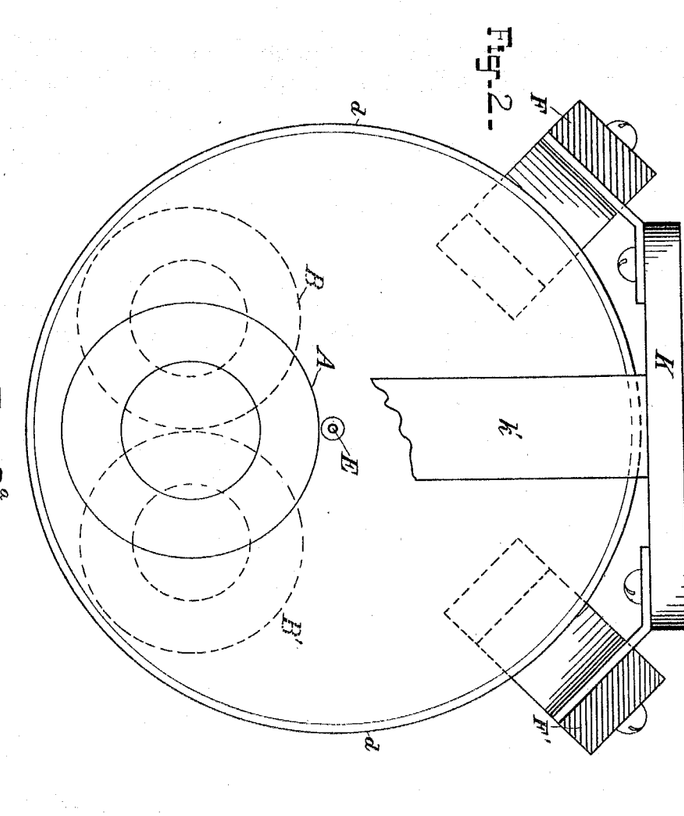
Fig. 2 is a plan view of the same, omitting certain parts.
Figure 2A:
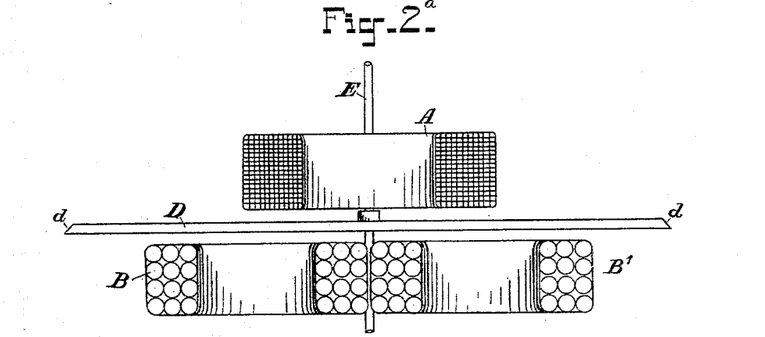
Figure 3:
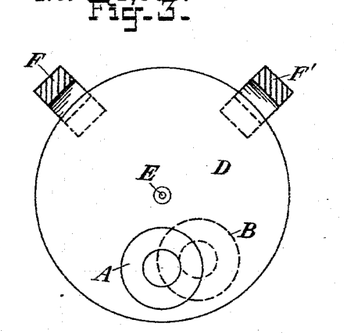
Figs. 3, 4, 5, 6 and 7 are diagrammatic views showing modified arrangements of the inducing coils.
Figure 4:
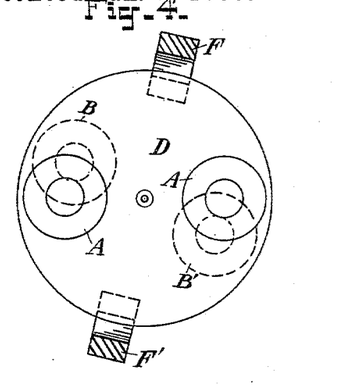
Figure 5:
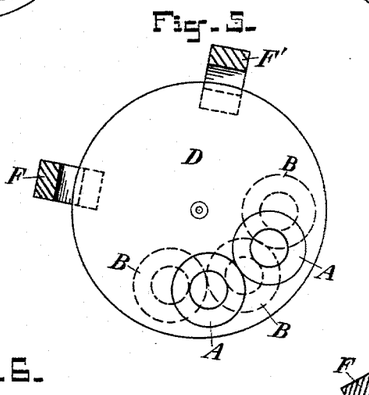
Figure 6:
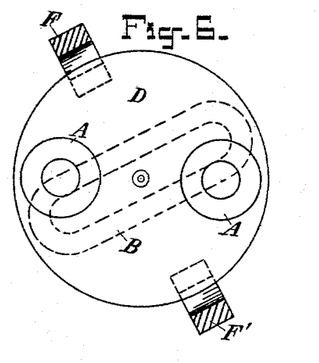
Figure 7:
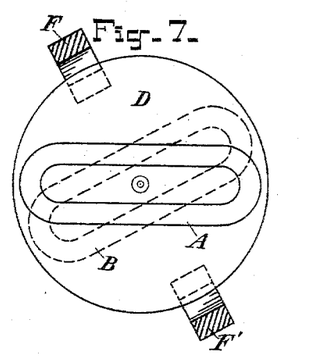

It is important to so locate the coil A with reference to the coils B and B' that the currents induced in the disk D by the coil A shall be within the magnetic field of the coils B and B', and vice versa. It is important also that the coils B and B' be so connected that the currents flowing in the adjacent portions of them shall be in the same direction, so as to have a like effect upon the disk. I have found that the relative position of the coils may be varied considerably without seriously affecting the operation of the meter, and one or more of the coils may be adjustable in the position, if desired, for the purpose of correcting the constant, the slot and screw connection shown in Fig. 1 being suitable for this purpose. It is not necessary to employ three coils, but I have found that the arrangement shown in Figs. 1 and 2 is convenient and desirable in practice. The coils A and B or the coils A and B' are alone sufficient, however, to produce satisfactory results.

In Figs. 3, 4, 5, 6 and 7 I have shown other arrangements of coils which have proved satisfactory in practice. In these figures, the coils upon the upper side of the disk corresponding to coil A of Figs. 1 and 2 are shown by full lines and those on the lower side, corresponding to coils B and B' of Figs. 1 and 2, by dotted lines.

Figure 8:
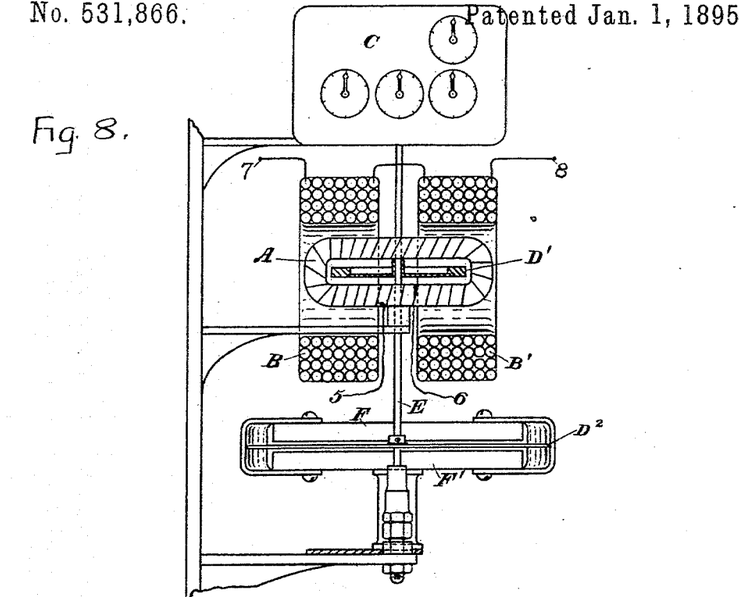
Figs. 8 and 9 are vertical sections of modified forms of the apparatus.

In Fig. 8 I have shown a meter of modified construction, in which the rotating member may, if desired, be provided either with a soft iron core or a soft iron rim D', and which is surrounded by the inducing coils vertically arranged and connected respectively in shunt and series to the two work circuits as already described. In this form of meter a separate retarding disk $D^2$ is employed, it being connected rigidly to the shaft E near its lower end. The magnets F and F' are so located that their poles embrace this disk, in order to secure the necessary retarding action.

Figure 9:
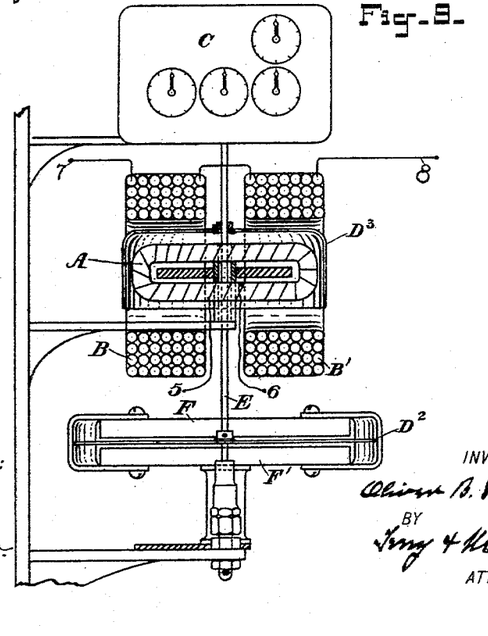

In Fig. 9 I have shown a modification in which the rotating member $D^3$ is of a cylindrical or cup-shape, and in which one of the coils; for example, the shunt-connected coil A, is located inside the movable element and in which the other coils B, B' are external to it. In this form also I have shown a separate retarding disk $D^2$, but it is obvious that in either of the forms just described the retarding magnets might be applied directly to the member acted upon by the inducing circuits.

One great advantage of the form of meter shown in Figs. 1 and 2 lies in the reduction of the weight of the moving parts by employing the same conductor for producing the moving and the retarding forces. This construction also renders the registration independent of the temperature of the disk, since any change in its resistance has an equal effect upon the torque and upon the retarding action. For the same reason the constant of the meter is practically unaffected by differences in the thickness or specific resistance of the disk. The disk $D^2$ may be replaced by any closed conductor of convenient form rotating with the shaft, but it is of advantage in all cases to construct it of a metal the electrical resistance of which has approximately the same temperature coefficient as that of the armature, so that the retarding effect may be varied by changes of temperature of the surrounding air, in the same ratio as the variations of torque on the armature from the same cause.

If the electromotive force impressed upon the shunt circuit of the meter is in quadrature with the current in the series coils when there is no lag in the work circuit, then, in order that the shunt current may be also in quadrature, the shunt connected coil and the resistance coil in series with it must contain as little self induction as possible. The shunt current then will be practically in phase with its impressed electromotive force. The current for either or both circuits in the meter may be supplied either directly or by means of transformers of known ratio, as indicated by dotted lines at T, T', in Fig. 10, attention being paid to the proportions so that the phase relations will not be practically disturbed through the range of working. Such proportioning is well underderstood and does not require detailed explanation.

If a transformer is used in the series circuit, causing a lag between the work current and the corresponding magnetic field in the meter, the shunt current should have a corresponding amount of lag. Other modifications in the connections and phase relations of the circuits require or permit the use of various combinations of resistance, self induction and capacity in the meter circuits. In all cases the organization must be such as to secure as nearly as possible a difference of phase of ninety degrees between the magnetic field produced by the shunt current and the field produced by the work current when there is no self induction or capacity in the work circuit.

It is well known that the energy transmitted by an alternating current is equal to the product of the current, the impressed electromotive force and a factor depending upon the difference of phase between them. This factor is commonly called the power factor and when the waves are sinusoidal it is equal to the cosine of the angle measuring the difference of phase.

For simplicity in treatment and explanation I here describe the action of the apparatus in the ordinary terms employed in connection with sinusoidal waves, but do not wish to be understood as in any way limiting the usefulness of my invention or the accuracy of the apparatus described to the measurement of currents of any particular wave form.

In Watt meters of ordinary construction it is customary to connect one set of coils in series with the work circuit, and an armature carrying another set of coils in shunt to the same circuit through a suitable resistance, the deflection or speed being then proportional to the power transmitted, and a maximum when the shunt and series currents are in the same phase. I have reversed the usual conditions as to the phase relation between the currents in the shunt and series coils, and in the meter herein described the torque is zero when the two currents are in the same phase, and is a maximum when the currents are a quarter period apart. This being the case, I connect the shunt coil in a circuit so organized that the current in it differs in phase a quarter period from the impressed electromotive force in the series circuit, and is proportional in amount to that electromotive force, under which conditions a maximum indication is given when there is no lag in the work circuit, the shunt and series currents being then a quarter period apart. If, now, the work current is caused to lag from this normal relation, by the presence of an inductive load, the shunt and series currents approach each other in phase, giving a diminishing indication of the meter, and if the lag amounts to a quarter wave length, so that no work is being done in the circuit, the series current is in phase with the shunt current and no rotation is produced. The torque for any given current and electromotive force is, in fact, proportional to the sine of the angle representing the displacement of phase between the currents in the shunt and series coils, which under the conditions here stated is equal to the cosine of the lag angle in the work circuit. Since the torque is also directly proportional to the product of the currents in the shunt and series coils, it is directly proportional to the power transmitted, and the retarding force being proportional to the speed, the registration is also directly proportional to the power transmitted.

Figure 11:
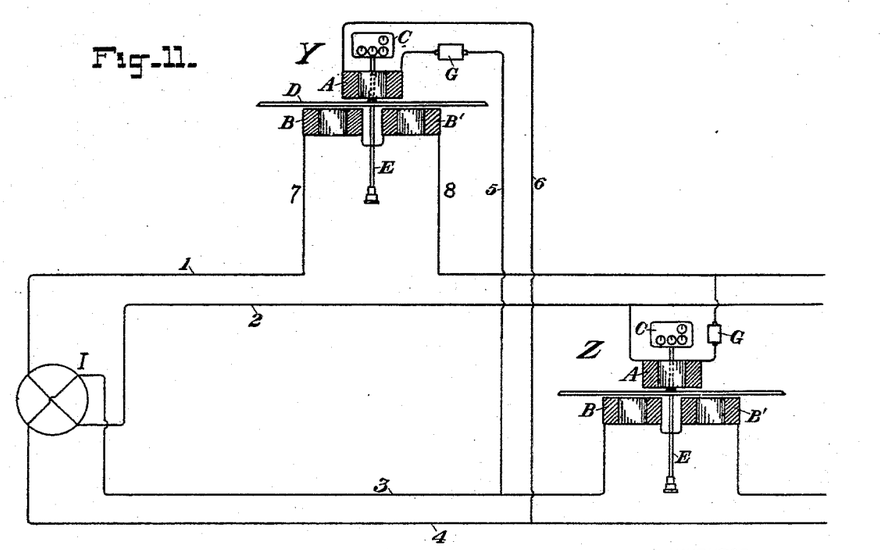
Fig. 11 is a diagram of circuits carrying two-phase currents, with a meter for each circuit.

If the same meter is intended to be used for measuring currents of different periodicities, the resistance of the shunt circuit may be varied by the adjustable rheostat G, the sections of which are marked to correspond with the periodicities required. In this way a meter may be made suitable for the whole range of periodicities in ordinary use, say from twenty-five to one hundred and thirty-three periods per second, by introducing the proper resistance into the shunt circuit. Other means may be employed for the proper adjustment of the constant of the meter, such, for instance, as changing the position of the coils with reference to the disk, or varying their effect by introducing iron cores, as indicated, for instance, in Fig. 1 at $a$ by dotted lines, or by varying the retarding force by changing the position of the magnets or varying their air gap; or the meter may be adjusted for a fixed periodicity and a suitable coefficient applied to the readings dependent upon the conditions when used. The last-named method is, however, somewhat inconvenient in practice. The indications of the dial may be directly in kilowatt-hours, or horse-power-hours, or in other convenient units. If the power transmitted by each of two currents in quadrature is the same or proportional, a single meter connected as shown in Fig. 10 may be used with sufficiently accurate results for all ordinary purposes. If, however, there is for any reason an inequality, a meter may be placed in a similar manner on each circuit, as shown in Fig. 11, the series coil of the meter Y, and the shunt coil of the other meter Z being connected to the first circuit 1, 2; the second circuit 3, 4, being similarly related to the remaining coils. A single meter may also be used by combining in it the effects of the currents in the two circuits, as will be readily understood by reference to Fig. 12. In this arrangement there are two distinct sets of coils A, B, and A', B', which may be located as shown in plan in Fig. 4, for example. The coil B is connected in series in the circuit 1, 2, and the coil A in shunt to the circuit 3, 4, upon which the impressed electromotive force is in quadrature to that upon 1, 2, in the organization shown. These electromotive forces are practically equal under usual conditions. The coils A and B produce a torque therefore proportional to the energy transmitted over the circuit 1, 2, independently of the coils A' B'. In like manner the coils A' B' produce a torque proportional to the energy transmitted over the circuit 3, 4. The combined effect upon the armature is therefore equal to the sum of two separate actions, producing a torque, and consequently a registration or indication, proportional to the whole energy transmitted. It is important that the coils A and A' be so located that no torque is produced by currents of different phase in them alone, and also that the coils B and B' be so located that they alone produce no torque, since such action would vary as the product of the currents in the coils A, A', and not in proportion to the energy transmitted, which is equal to the sum of that transmitted over the respective circuits.

Figure 12:
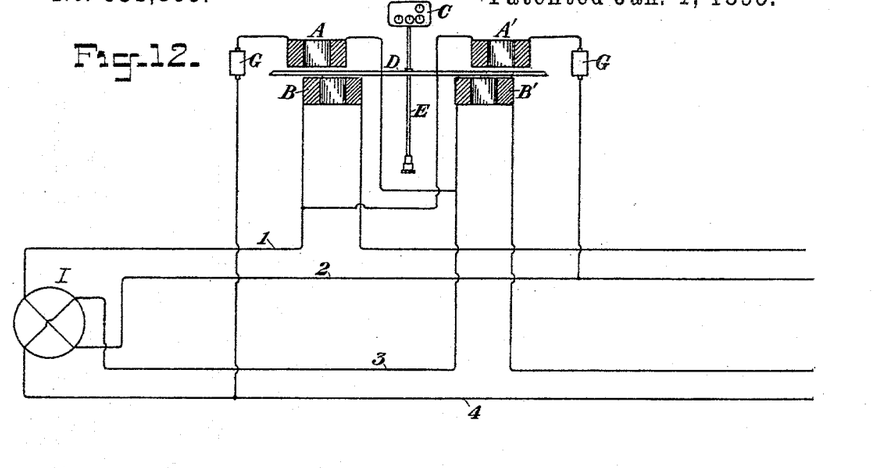
Fig. 12 is a diagram illustrating a single meter applied to a two-phase four-wire circuit.

The arrangement shown in Fig. 12 is diagrammatic and intended merely to illustrate this organization of the meter. The form and arrangement of the parts may be varied in many ways, and the same arrangement of the meter may be used to measure the energy transmitted over any two circuits, separate or concatenated, and of any phase relation, by suitable attention to the methods of connection shown in the various drawings. The specific organization shown and described in connection with Fig. 12, I have claimed in another application filed November 24, 1894, Serial No. 529,874, the said application constituting a division of this application.

Figure 13:
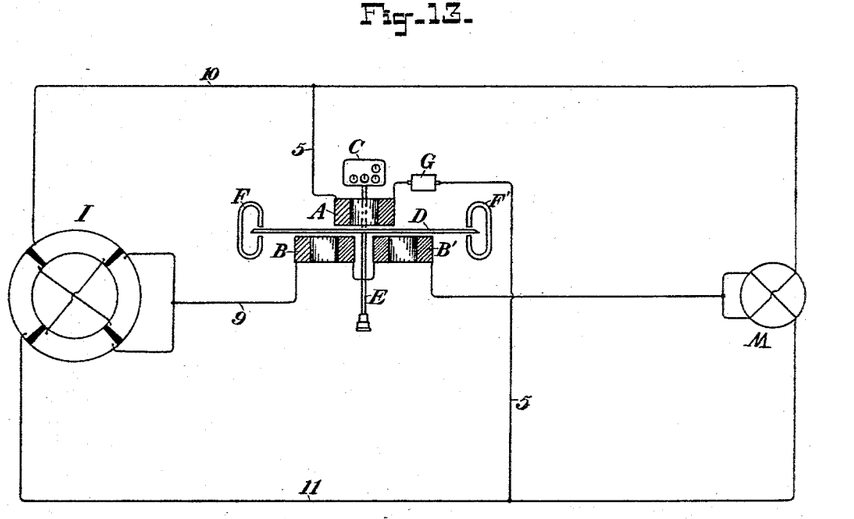
Fig. 13 is a diagram showing a meter applied directly to a two-phase three-wire circuit.

In Fig. 13 is shown a convenient and practicable method of connecting the meter with a three-wire distribution circuit carrying two-phase currents. In this figure the source of the two-phase currents is illustrated at I, which may be any suitable device such as one or more transformers or the armature of a generator. The currents supplied to a motor or other device suitable for two-phase currents at M may be assumed as practically equal, and the impressed electromotive forces of the two branches are also nearly equal, or proportional, in practice. The ordinary variations from exact equality, due to slight differences in the windings of the devices in the work circuit, affect the accuracy of the meter in a very small degree, so that the energy supplied to any device, not radically defective, is correctly measured. The conductor 9 is the conductor which is common to both circuits 9, 10 and 9, 11, and carries a resultant current differing in phase forty-five degrees from the component currents in the circuits 9, 10 and 9, 11. The resultant impressed electromotive force upon the conductor 9, through the combined circuits 10, 11, also differs forty-five degrees in phase from the electromotive forces impressed upon the circuits 9, 10 and 9, 11. The coils B, B are connected in series with the conductor 9, directly as shown, or inductively if desired.

In order to impress upon the circuit 5, including the shunt coil, an electromotive force in quadrature with the resultant electromotive force impressed upon the conductor 9, the circuit 5 is connected across the conductors 10, 11, either directly or inductively. The maximum electromotive force upon the conductor 9 occurs when the electromotive forces of the circuits 9, 10 and 9, 11 are equal, at which time they are opposite with respect to the circuit 5 across the conductors 10, 11, so that the resultant electromotive force in circuit 5 is zero at this instant; that is to say, the electromotive forces impressed upon the two circuits containing the coils A and the coils B, B' respectively, are in quadrature. Under these conditions, the meter will measure the true energy delivered, if the constant is properly adjusted to the conditions under which it is used.

Figure 14:
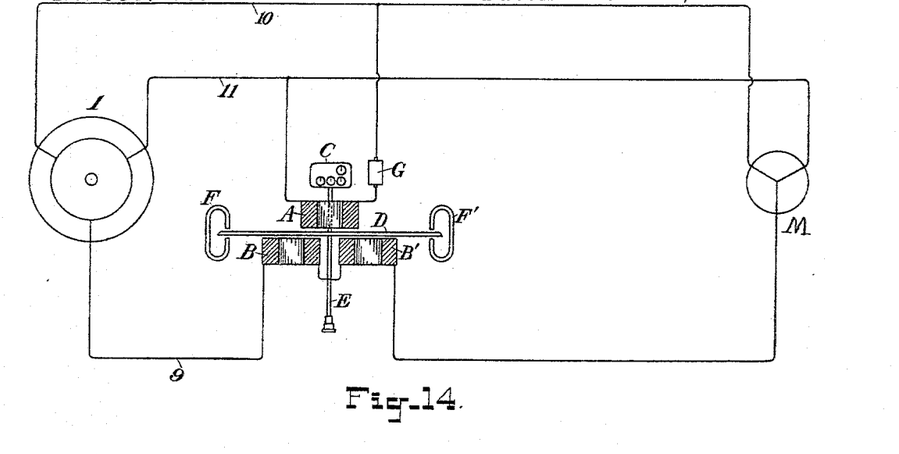
Figs. 14 and 15 illustrate the use of the meter for measuring three-phase currents.

In Fig. 14 a meter is shown as applied to a three-phase circuit. In this figure the coil A is connected in shunt between the conductors 10 and 11, and the coils B, B', are connected in series with the conductor 9. The same relations of electromotive forces exist so far as the meter is concerned in this organization as described with reference to Fig. 13, so that although the difference of phase between the impressed electromotive forces upon the three branches is one hundred and twenty degrees, that between the circuits including the respective coils A and B, B', is ninety degrees.

In a three-phase distribution, or in any symmetrical multiphase system of concatenated circuits, the current flowing over any given conductor may be considered as the resultant of two currents differing in phase, and as having a phase relation intermediate to the phases of the component currents. It may also be said that an electromotive force is impressed upon each conductor, the circuit being completed through other conductors symmetrically related to it, and the phase of this electromotive force is intermediate to and differs by an equal angle from the separate electromotive forces across the adjacent circuits. This electromotive force differs in phase from the current flowing in the conductor upon which it is impressed, by the lag angle of the work current. It is difficult to express the phase relations in tri-phase and certain other multiphase circuits in the ordinary terms applicable to simple circuits, and I here adopt certain forms of expression for the sake of simplicity and clearness, and have defined or explained such expressions to avoid ambiguity.

Several forms of winding have been adopted for the armatures of multiphase generators, variously known as "star-windings," "delta-windings," &c., but in any concatenated system of distribution the currents flowing in the individual wires may be regarded as the resultant of two currents differing in phase, flowing in adjacent conductors of an equivalent system of double the number of wires, each winding of the generator having a complete independent circuit. The phenomena of currents in concatenated circuits may often be expressed in terms of such component currents with greater clearness than by treating the resultant currents alone, and the same may be said of electromotive forces.

In applying the meter herein described to multiphase circuits, the connections necessary to obtain the required relation of quadrature between its shunt and series circuits may be readily determined by a consideration of the phase relations in the manner indicated. Having connected the coils B, B' or their equivalents in series with one of the conductors, the shunt circuit 5 must be connected across a pair of conductors symmetrically related on either side of the said series conductor, so that the electromotive forces of the separate or component circuits are impressed in series upon the circuit 5. Fig. 14 shows this method of connection as applied to a three-phase circuit. When, as in a two-phase system of distribution, a difference of phase of ninety degrees is readily obtained more directly, this method of connection is unnecessary in many cases, but the variety of useful or possible combinations is so great that it is not attempted herein to more than indicate clearly the general methods to be adopted.

Figure 15:
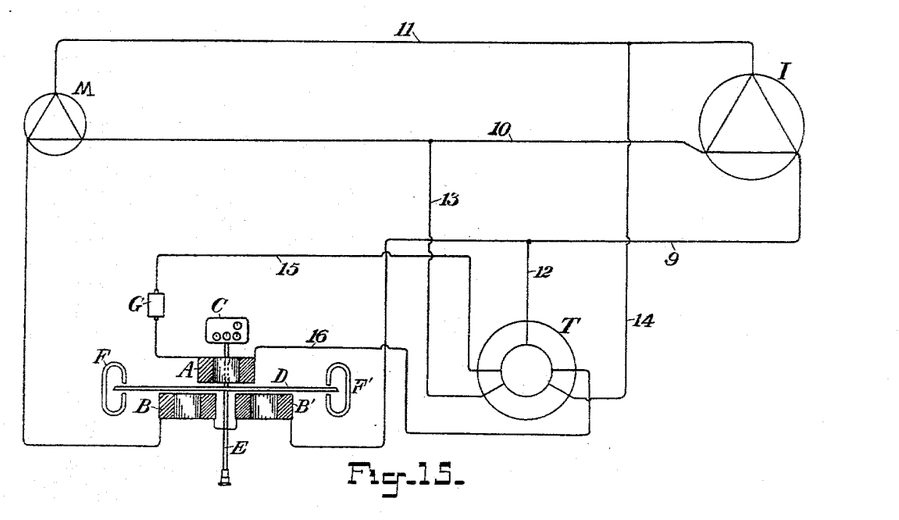

In Fig. 15 an arrangement is shown in which a transformer T is used to obtain the required phase relation of the electromotive force impressed upon the shunt circuit of the meter. As here shown, a rotating field is produced in the transformer by connections 12, 13, and 14, to the multiphase circuit 9, 10, 11, and currents having the required phase relation are derived through the conductors 15, 16 which are connected to the shunt coil A of the meter. The transformer may be of any suitable form and may contain a single coil, or a separate primary and secondary, and should be connected to the transmission circuit in a manner suitable to the phase relations, so as to obtain a rotating field. Two transformers may be used to produce a resultant electromotive force of the proper phase relation if desired.

It will be understood that the constant of the meter must be adjusted to suit the requirements of any particular method of connection in the circuits. While the indications of any given meter if connected in various ways, would be proportional to the energy transmitted, it might require the application of a coefficient, depending for its value upon the known conditions. It is usually more convenient in practice to design the meter with reference to its proposed use, so that it will directly indicate the energy transmitted.

The several specific forms of apparatus shown and described and the methods of connecting the circuits therewith are illustrative of my invention, and its applications, and I do not desire to be limited to the precise form or arrangement of any of the parts. Moreover, there are various fundamental features of the invention which are applicable to other uses than strictly energy meters. For instance, they may be adapted for use with indicating or recording Watt meters, volt meters and ammeters, and in certain other applications for patents, Serial Nos. 523,516 and 523,517, filed September 19, 1894, I have claimed various of such adaptations. Electric meters have been heretofore proposed or constructed in which it has been erroneously assumed that rotation may be produced by the action of alternating magnetic fields differing in phase, but without producing a resultant shifting field, or its equivalent, and in various other ways.

I do not limit myself to any particular theory of the inductive phenomena by which rotation is produced, and while I have herein described and claimed as my invention certain specific forms of apparatus, and improvements therein, I may nevertheless employ the other more general features of my invention in connection with any form of apparatus capable of securing the same results as the apparatus herein described.

I claim as my invention—

1. The method of measuring the energy of multiphase alternating currents which consists in the creation of two magnetic fields, one of which is proportional to and in phase with the current in one of the circuits, and the other proportional to and in phase with an electromotive force in quadrature with that of the said circuit, establishing thereby a resultant inductive influence and producing thereby mechanical effects of definite value.

2. The method of measuring the energy transmitted by alternating currents which consists in establishing two alternating magnetic fields which are respectively proportional in strength to the current and to the electromotive force and which differ in phase by the complement of the angle of current lag in the work-circuit, producing thereby a resultant inductive influence, subjecting a movable conductor to said inductive influence, and indicating the resulting motion against a definite opposing force.

3. The method of measuring the energy transmitted by alternating currents, which consists in subjecting a movable conductor to two opposing forces, one approximately proportional to the product of current, electromotive force and the sine of the phase angle between them, and the other proportional to the resulting motion, and indicating the amount of such motion.

4. The method of measuring the energy transmitted by alternating currents which consists in subjecting a movable conductor to two opposing forces, one force approximately proportional to the product of the work current, an electromotive force in quadrature with that of the work circuit and proportional thereto, and the sine of the phase angle between said electromotive force and said current, and the other force proportional to the resulting movement or speed, and indicating, registering, or recording the total movement.

5. The method of measuring the energy transmitted by alternating currents which consists in producing an alternating magnetic field proportional to the strength of the current in the work-circuit, producing a second alternating magnetic field proportional to an electromotive force of known value with reference to that of the work-circuit and differing in phase from the first-named field by the complement of the angle of current lag in the work-circuit, establishing by said two fields a resultant inductive influence, subjecting a movable conductor thereto and indicating the resulting motion against a definite opposing force.

6. The method of measuring the energy transmitted by multiphase alternating currents over three or more conductors, which consists in establishing a magnetic field proportional in strength to the current delivered over one conductor to the work-circuit, deriving a current from two other conductors between which the electromotive force is in quadrature with that impressed upon the first-named conductor, and establishing by such current a second field, producing a resultant shifting field by these two component fields, and by the inductive influence of the shifting field producing mechanical motion against a retarding force directly proportional to the rate of motion, and registering the amount of such motion.

7. The method of obtaining an electromotive force in quadrature with that impressed upon a given conductor in a multiphase system of distribution, which consists in combining in series the electromotive forces of two circuits in which the phases of electromotive force differ by equal angles of opposite sine from the electromotive force impressed upon the first named conductor.

8. The method of measuring the energy transmitted by alternating currents which consists in creating a magnetic field by the resultant of two component currents differing in phase and creating a second field by currents due to the algebraic sum of the electromotive forces producing said component currents, producing a resultant shifting field by said two fields, and by said shifting field producing motion proportional to the energy transmitted.

9. The method of impressing upon the shunt circuit of an electric meter for multiphase currents, an electromotive force in quadrature with that impressed upon the series circuit, which consists in combining in series the electromotive forces of two circuits in which the phases of electromotive force differ by equal and opposite angles from that impressed upon said series circuit, and applying the resultant electromotive force to said shunt circuit.

10. The method of measuring energy transmitted over a multiphase alternating current system, which consists in producing an alternating magnetic field proportional to the resultant of two component currents of the system, producing a second magnetic field proportional to and in phase with the electromotive force obtained by the addition of the electromotive forces to which the component currents are due, establishing thereby a resultant shifting magnetic field, subjecting a rotary armature to the inductive action thereof and recording, registering or indicating the movement of such armature against an opposing force.

11. The method of measuring the energy of multiphase alternating currents, which consists in inducing in a movable closed conductor currents caused by the combined inductive effects of a work-current and a shunted current which, when no lag exists in said work-current, is in quadrature therewith, and indicating the resulting motion against a known opposing force.

12. In an electric meter for alternating currents the combination of a rotating disk, two coils or sets of coils having their axes directed toward said disk and located in different circumferential positions, one of said coils being wound with relatively small wire adapted for shunt circuit connection, and the other coil or set of coils being wound with thick wire adapted for series connection, a non-inductive resistance included in series with the shunt-connected coil, and a retarding device consisting of a magnet whose poles embrace said disk and are directed toward opposite sides of said disk.

13. An electric meter consisting of the combination of a disk of conducting material, a shaft carrying the same, a counting train driven by said shaft, means for producing two magnetic fields differing in phase and the axes of which traverse said disk at points so located that the two fields combine to form a resultant shifting field, and a retarding device opposing to the rotation of the shaft a force proportional to the speed.

14. In an electric meter for alternating currents, the combination of a disk of conducting material, a shaft carrying the same, a solenoid having its axis approximately perpendicular to the plane of the disk, a second solenoid or set of solenoids having their axes directed toward said disk at another point or points, than the first, and means for adjusting the relative positions of said solenoids, substantially as described.

15. In a meter for measuring alternating electric currents, the combination with the frame having horizontal arms $k'$, $k^2$, of the coils A, B, and B', supported from said arms, and the clamping devices for securing them to said arms, substantially as described.

16. In an electric meter for alternating currents, the combination of a supporting frame, having a horizontal arm $k^2$ and the coils B and B' carried thereby, and the adjustable support for said coils carried upon said arm, substantially as described.

17. In a meter for alternating currents, the combination of actuating coils and an armature subjected to the influence of said coils consisting of a disk of conducting material, the dimensions of which, parallel to its axis, are greater than the thickness of the metal from which it is formed, whereby vibration in a direction normal to its surface is prevented.

18. In a meter for alternating electric currents, an actuating device consisting of a thin rotating disk of conducting material, having a flange or bead formed upon its periphery, a shunt-connected coil upon one side of said disk, and a series-connected coil upon the opposite side of said disk, said coils having their windings approximately parallel to said disk.

19. In a meter for multiphase alternating electric currents, the combination with a fixed coil adapted to be connected in series with one of the circuits, of a fixed coil having a relatively large number of turns and adapted to be connected across a second circuit, a movable armature having an independent closed circuit in inductive relation to both of said coils, and an adjustable non-inductive resistance connected in series with the shunt connected coil.

20. A meter for multiphase alternating electric currents, comprising the combination of a coil receiving currents proportional to the electromotive force upon one of the circuits, a second coil receiving currents proportional to the currents flowing in a second circuit, the phase of the currents in the first coil being practically in quadrature with the currents in the second coil when no lag exists in the current flowing to the work-circuit, an armature comprising a closed conducting circuit, and an indicating or registering device operated by the movements of the armature.

21. A meter for multiphase alternating electric currents, comprising a series coil traversed by the currents flowing in one of the circuits, and a shunt circuit comprising a coil and a non-inductive resistance in series therewith, and connected across a second circuit whose impressed electromotive force is in quadrature with that impressed upon the series circuit.

22. In a meter for measuring multiphase alternating electric currents, the combination of a coil connected across one of the work circuits, a second coil connected in series with the second work circuit, an armature consisting of a rotary disk toward different points of which said coils are directed, and a registering or indicating device operated by the movements of said armature.

23. The combination with the circuits of a multiphase system of distribution by alternating currents, of a meter containing two actuating coils of which one is traversed by currents due to the resultant of two component currents differing in phase and the other is traversed by currents due to the algebraic sum of the electromotive forces producing those component currents.

24. In combination with a system of alternating current distribution for multiphase currents in which one conductor is common to two circuits, a meter having an actuating device consisting of an armature, an actuating coil connected in series in the common conductor, and a second actuating coil connected in shunt between two other conductors.

25. In a system of multiphase electrical distribution, a meter in which the actuating device comprises a coil connected in series with a circuit carrying the resultant of two currents differing in phase, and a second coil connected in shunt between two conductors carrying the components forming that resultant current.

26. The combination with the circuits of a multiphase system of alternating current distribution, of a meter having one coil or a set of coils connected in series with one of the conductors carrying a current supplied by two windings of the source, each winding having one terminal connected to said conductor, and a shunt circuit including another coil or set of coils of the meter connected to the remaining terminals of said windings.

27. In an electric meter for alternating currents, an armature having a closed conducting circuit, means for producing a shifting field to which the armature is subjected, and means for inducing eddy currents therein directly proportional to the rate of movement of the armature.

28. An actuating device for use upon multiphase systems of alternating current distribution consisting of an armature, and two actuating circuits for driving said armature, one of said actuating circuits having a relatively high non-inductive resistance and adapted to be connected in shunt and the other of said circuits being of relatively low resistance and adapted to be connected in series, said circuits acting conjointly when traversed by alternating currents differing in phase to produce rotation of said armature.

29. In combination with the circuits of a multiphase system of alternating current distribution, an actuating device consisting of an armature having a closed conducting circuit, an actuating coil of relatively high non-inductive resistance connected between the conductors of one branch of the system, a second actuating coil of relatively low resistance connected in a branch of the system other than that across which the first-named coil is connected, the impressed electromotive forces upon the two coils being in quadrature.

In testimony whereof I have hereunto subscribed my name this 15th day of September, A. D. 1894.

OLIVER B. SHALLENBERGER.

Witnesses:
CHARLES A. TERRY,
WESLEY G. CARR.